Figures 1, 2:
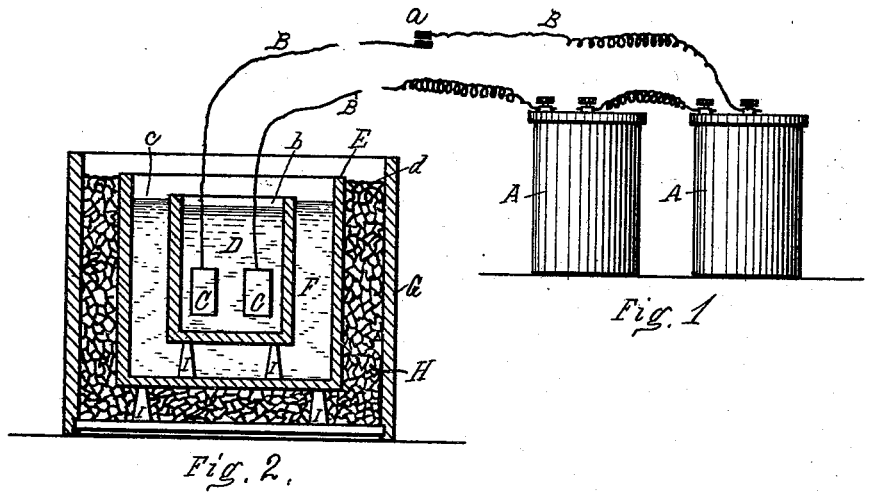

(No Model.)

C. W. BRUNSON.
PROCESS OF PURIFYING LIQUIDS.

No. 479,781. Patented Aug. 2, 1892.

Witnesses
A. S. Hammerle
Chas Sachs

Courtland W Brunson Inventor
by Robert S Carr
Attorney

UNITED STATES PATENT OFFICE.

COURTLAND W. BRUNSON, OF HAMILTON, OHIO.

PROCESS OF PURIFYING LIQUIDS.

SPECIFICATION forming part of Letters Patent No. 479,781, dated August 2, 1892.

Application filed November 9, 1891. Serial No. 411,416. (No specimens.)

*To all whom it may concern:*

Be it known that I, COURTLAND W. BRUNSON, of Hamilton, Butler county, Ohio, have invented a certain new and useful Process of Purifying Liquids, of which the following is a specification.

My invention relates to the process of purifying spirituous or alcoholic liquors or other liquids by the use of electrolysis as a catalytic agent.

Heretofore the application of electrolysis has been confined to liquors of either a normal or high degree of temperature to precipitate the impurities as sediment.

The object of my invention is to increase the catalytic action of electrolysis by refrigerating the liquor and keeping it frigid during its application to effect a separation of the impurities from the liquor and cause them to rise to the surface; and to this end the liquor is placed in an appropriate vessel, where its temperature is reduced to a sufficient degree by appropriate means and there retained while a current of electricity is introduced therein sufficient to cause the impurities to accumulate and remain on the surface during the continuance of the process or until removed therefrom, when the purified liquor remaining may be emptied from the vessel and the process repeated.

A simple apparatus by which my process may be accomplished is illustrated in the accompanying drawings, in which—

Figure 1 is an elevation of a galvanic battery consisting of two cells connected together; Fig. 2, a vertical section of a refrigerating apparatus.

In the drawings, A represents the cells of the battery, that are connected together by a wire; B, insulated wires extending, respectively, from the opposite poles of said battery; C, electrodes attached to the extremities of wires B. *a* shows a break in one of said wires, adapted to open and close the circuit from the battery through electrodes C.

D represents a vessel filled with liquor to a point *b*, near its top, and is suspended or placed within larger vessel E and surrounded by a frigorific mixture F, contained in vessel E, to a point, as at *c*.

G is a tub or large vessel in which vessel E is placed and surrounded with a mixture of ice and salt H to a point, as at *d;* I, blocks to support vessels D and E in proper relation to each other and to vessel G. Said vessels may be covered by an appropriate lid or lids, and they may be composed of any appropriate material. Vessel D, however, is preferably made of glass or some non-conductor of electricity. If composed of copper or other conducting material, the process will be equally effective, but will necessitate the use of a stronger electrical current. The electrodes C should consist of carbon or other appropriate material that will resist the action of the liquor. They should be entirely immersed, that the electrical current may pass between them through the liquor, instead of on its surface, and the wires B should be insulated from contact with the liquor to cause the current to reach the electrodes.

To carry my invention into effect, the electrodes C are placed in vessel D, near its bottom and some distance apart. The circuit is opened at *a*. The liquor is then filled in vessel D and its temperature reduced to a desired degree by means of the frigorific mixtures Y and H, when the circuit is closed at *a* and a current of electricity is established between the electrodes through the liquor, effecting almost instant separation of the impurities from the liquor and causing them to seek the surface, where they will remain during the continuance of the process or until removed by skimming or otherwise, when the purified liquor may be removed from vessel D and the process repeated indefinitely. Should the liquor be permitted to resume its normal temperature, or should the current of electricity be discontinued before the impurities are removed from the surface, they will descend again in solution with the liquor or settle to the bottom thereof.

The frigorific mixture F may consist of phosphate of soda, nitrate of ammonia, and dilute nitric acid in proper proportions or of any other ingredients capable of sufficiently decreasing the temperature of the liquor in vessel D, or any appropriate refrigerating device or apparatus may be employed, instead of the frigorific mixture, the object being to reduce the temperature of the liquor to a degree near its freezing-point, which will vary according to the specific gravity of different liquors used.

For alcohol containing fifty-two per cent. water, which freezes at a temperature of about 26° Fahrenheit, the temperature should be about 20° Fahrenheit. For alcohol containing forty per cent. water, known as "extra-strong whisky and rum," which freezes at a temperature of about 62° Fahrenheit, the temperature should be about 50° Fahrenheit. For alcohol containing 20 per cent. water, which freezes at about 103° Fahrenheit, the temperature should be reduced to about 85° Fahrenheit, and for liquor or liquid having different freezing-points the temperature desired should approach the freezing-point in nearness proportioned to the degree of temperature required for its freezing. The less the frigidity required the nearer the temperature should be reduced to the point of freezing.

The galvanic battery may consist of any number of cells required to produce or generate the necessary current, or it may be supplanted by a dynamo-electrical machine or any apparatus capable of generating a sufficient electrical current for the purpose. The amount of current required will vary with the bulk or quantity of liquor to be acted upon or with its more or less complete insulation from the surroundings.

In addition to spirituous or alcoholic liquor my process is applicable to other liquids, especially those of an oily nature, to effect a separation of the oily constituents therefrom, and when applied to milk the cream is separated from the water or thinner portion as effectively as can be done by centrifugal or other well-known cream-extractors.

Having fully described my invention, what I claim, and desire to secure by Letters Patent, is—

1. The process of purifying spirituous liquor or other liquid by means of the application thereto of electrolysis while said liquor or liquid is kept in a state of frigidity approximating its freezing-point.

2. The process of purifying spirituous liquor or other liquid, consisting in first reducing the temperature thereof to near its freezing-point and then submitting it to the action of electricity.

COURTLAND W. BRUNSON.

Witnesses:
L. D. HANCOCK,
JAS. FITTON.